United States Patent
Gschwind et al.

(10) Patent No.: US 10,642,586 B2
(45) Date of Patent: *May 5, 2020

(54) COMPILER OPTIMIZATIONS FOR VECTOR OPERATIONS THAT ARE REFORMATTING-RESISTANT

(71) Applicant: International Business Machines Corporation, Armonk, NY (US)

(72) Inventors: Michael Karl Gschwind, Chappaqua, NY (US); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,061

(22) Filed: Dec. 8, 2018

(65) Prior Publication Data

US 2019/0108005 A1 Apr. 11, 2019

Related U.S. Application Data

(63) Continuation of application No. 15/801,279, filed on Nov. 1, 2017, now Pat. No. 10,169,012, which is a
(Continued)

(51) Int. Cl.
 *G06F 8/41* (2018.01)
(52) U.S. Cl.
 CPC .................................. *G06F 8/4441* (2013.01)
(58) Field of Classification Search
 None
 See application file for complete search history.

(56) References Cited

U.S. PATENT DOCUMENTS 5,027,272 A 6/1991 Samuels
5,560,009 A 9/1996 Lenkov et al.
(Continued)

FOREIGN PATENT DOCUMENTS

CA 1264859 A 1/1990
GB 002409067 B 12/2006
(Continued)

OTHER PUBLICATIONS

Author Unknown, "Dependence Analysis", printed from https://engineering.purdue.edu/~milind/ece573/2011spring/lecture-14.pdf, Apr. 23, 2011.
(Continued)

*Primary Examiner* — Matthew J Brophy
(74) *Attorney, Agent, or Firm* — Martin & Associates, LLC; Derek P. Martin

(57) ABSTRACT

An optimizing compiler includes a vector optimization mechanism that optimizes vector operations that are reformatting-resistant, such as source instructions that do not have a corresponding reformatting operation, sink instructions that do not have a corresponding reformatting operation, a source instruction that is a scalar value, a sink instruction that may produce a scalar value, and an internal operation that depends on lanes being in a specified order. The ability to optimize vector instructions that are reformatting-resistant reduces the number of operations to improve the run-time performance of the code.

17 Claims, 13 Drawing Sheets

Related U.S. Application Data continuation of application No. 14/827,639, filed on Aug. 17, 2015, now Pat. No. 9,880,821.

(56) References Cited

U.S. PATENT DOCUMENTS

| | | | |
|---|---|---|---|
| 5,619,692 A * | 4/1997 | Malkemus | G06F 16/24537 |
| 5,721,924 A | 2/1998 | Kitadate | |
| 5,828,884 A | 10/1998 | Lee et al. | |
| 5,881,288 A | 3/1999 | Sumi et al. | |
| 5,887,183 A | 3/1999 | Agarwal et al. | |
| 5,968,164 A | 10/1999 | Loen et al. | |
| 5,987,248 A | 11/1999 | Murayama et al. | |
| 5,996,057 A | 11/1999 | Scales, III et al. | |
| 6,065,106 A | 5/2000 | Deao et al. | |
| 6,351,750 B1 | 2/2002 | Duga et al. | |
| 6,550,059 B1 * | 4/2003 | Choe | G06F 8/447 |
| | | | 717/149 |
| 6,728,874 B1 | 4/2004 | Sijstermans et al. | |
| 6,934,938 B2 * | 8/2005 | May | G06F 8/314 |
| | | | 708/490 |
| 7,136,953 B1 | 11/2006 | Bisson et al. | |
| 7,197,625 B1 | 3/2007 | Van Hook et al. | |
| 7,426,597 B1 | 9/2008 | Tsu et al. | |
| 7,552,427 B2 | 6/2009 | Adiletta et al. | |
| 7,600,155 B1 | 10/2009 | Nickolls et al. | |
| 7,716,642 B1 | 5/2010 | Michael et al. | |
| 8,010,953 B2 | 8/2011 | Gschwind | |
| 8,108,846 B2 | 1/2012 | Gschwind | |
| 8,161,266 B2 | 4/2012 | Colavin | |
| 8,255,886 B2 | 8/2012 | Lachner | |
| 8,255,891 B2 | 8/2012 | Chen et al. | |
| 8,327,344 B2 * | 12/2012 | Gschwind | G06F 8/4441 |
| | | | 717/149 |
| 8,423,983 B2 * | 4/2013 | Gschwind | G06F 9/30109 |
| | | | 717/145 |
| 8,458,681 B1 | 6/2013 | Coutant et al. | |
| 8,566,645 B2 | 10/2013 | Rentschler et al. | |
| 8,725,990 B1 | 5/2014 | Karandikar et al. | |
| 9,182,959 B2 * | 11/2015 | Gonion | G06F 8/41 |
| 9,256,505 B2 | 2/2016 | Chakravarty | |
| 9,619,214 B2 * | 4/2017 | Gschwind | G06F 7/76 |
| 9,626,168 B2 * | 4/2017 | Gschwind | G06F 9/30036 |
| 9,652,231 B2 * | 5/2017 | Eichenberger | G06F 9/30025 |
| 2001/0049763 A1 | 12/2001 | Bross et al. | |
| 2002/0199173 A1 | 12/2002 | Bowen | |
| 2003/0182650 A1 | 9/2003 | Smith | |
| 2004/0003220 A1 * | 1/2004 | May | G06F 8/445 |
| | | | 712/245 |
| 2004/0003376 A1 * | 1/2004 | May | G06F 8/314 |
| | | | 717/132 |
| 2004/0003381 A1 * | 1/2004 | Suzuki | G06F 8/4441 |
| | | | 717/150 |
| 2004/0054877 A1 | 3/2004 | Macy et al. | |
| 2004/0158819 A1 | 8/2004 | Cuomo et al. | |
| 2004/0221268 A1 | 11/2004 | Nichols et al. | |
| 2004/0221274 A1 | 11/2004 | Bross et al. | |
| 2004/0221276 A1 | 11/2004 | Raj | |
| 2004/0268094 A1 | 12/2004 | Abdallah et al. | |
| 2005/0066146 A1 | 3/2005 | Barry et al. | |
| 2005/0125647 A1 | 6/2005 | Symes et al. | |
| 2005/0198483 A1 | 9/2005 | Park et al. | |
| 2005/0213837 A1 | 9/2005 | Boykov et al. | |
| 2005/0283773 A1 | 12/2005 | Eichenberger et al. | |
| 2006/0125663 A1 | 6/2006 | Adiletta et al. | |
| 2006/0171694 A1 | 8/2006 | Kamimura et al. | |
| 2006/0243787 A1 | 11/2006 | Dravnieks et al. | |
| 2007/0192762 A1 * | 8/2007 | Eichenberger | G06F 8/443 |
| | | | 717/159 |
| 2007/0226469 A1 | 9/2007 | Wilson et al. | |
| 2008/0034356 A1 * | 2/2008 | Gschwind | G06F 8/445 |
| | | | 717/149 |
| 2008/0034357 A1 * | 2/2008 | Gschwind | G06F 8/445 |
| | | | 717/149 |
| 2008/0098376 A1 * | 4/2008 | Fulton | G06F 8/4451 |
| | | | 717/151 |
| 2008/0288930 A1 | 11/2008 | Chen et al. | |
| 2009/0089547 A1 | 4/2009 | Moyer | |
| 2009/0089763 A1 | 4/2009 | Chen et al. | |
| 2009/0198977 A1 | 8/2009 | Gschwind et al. | |
| 2010/0042815 A1 * | 2/2010 | Gonion | G06F 9/30072 |
| | | | 712/222 |
| 2010/0058302 A1 | 3/2010 | Broscaru et al. | |
| 2010/0095285 A1 | 4/2010 | Gschwind | |
| 2011/0047359 A1 * | 2/2011 | Eichenberger | G06F 8/451 |
| | | | 712/222 |
| 2011/0154303 A1 | 6/2011 | Rice et al. | |
| 2011/0209003 A1 | 8/2011 | Matsukawa | |
| 2011/0271259 A1 | 11/2011 | Moench et al. | |
| 2012/0030652 A1 | 2/2012 | Jelinek | |
| 2012/0060016 A1 | 3/2012 | Eichenberger et al. | |
| 2012/0185836 A1 | 7/2012 | Loenko | |
| 2013/0247010 A1 | 9/2013 | Bradbury et al. | |
| 2013/0263092 A1 | 10/2013 | Chikahisa et al. | |
| 2014/0019506 A1 | 1/2014 | Kuo | |
| 2014/0095842 A1 * | 4/2014 | Caprioli | G06F 9/30036 |
| | | | 712/222 |
| 2014/0164733 A1 * | 6/2014 | Jha | G06F 9/30032 |
| | | | 712/4 |
| 2014/0192049 A1 | 7/2014 | Stanley et al. | |
| 2014/0196013 A1 | 7/2014 | Orr et al. | |
| 2014/0201450 A1 | 7/2014 | Haugen | |
| 2014/0237460 A1 * | 8/2014 | Schmidt | G06F 8/443 |
| | | | 717/160 |
| 2014/0298336 A1 | 10/2014 | Taniuchi | |
| 2015/0095626 A1 | 4/2015 | Nakagawa et al. | |
| 2015/0106793 A1 | 4/2015 | Kahne et al. | |
| 2015/0169294 A1 | 6/2015 | Brock et al. | |
| 2015/0178056 A1 * | 6/2015 | Amiri | G06F 8/443 |
| | | | 717/151 |
| 2015/0186232 A1 | 7/2015 | Conner et al. | |
| 2015/0261636 A1 | 9/2015 | Chakravarty, Sr. | |
| 2015/0268940 A1 * | 9/2015 | Baghsorkhi | G06F 8/452 |
| | | | 717/160 |
| 2015/0277880 A1 * | 10/2015 | Gschwind | G06F 8/52 |
| | | | 717/159 |
| 2015/0331783 A1 | 11/2015 | Blackman et al. | |
| 2016/0048379 A1 * | 2/2016 | Gschwind | G06F 7/768 |
| | | | 717/159 |
| 2016/0048445 A1 * | 2/2016 | Gschwind | G06F 8/41 |
| | | | 717/130 |
| 2016/0179529 A1 | 6/2016 | Corbal et al. | |
| 2016/0217197 A1 | 7/2016 | Rachlin et al. | |
| 2016/0299746 A1 * | 10/2016 | De | G06F 8/41 |
| 2017/0052768 A1 * | 2/2017 | Gschwind | G06F 8/4441 |
| 2017/0052769 A1 * | 2/2017 | Gschwind | G06F 8/4441 |

FOREIGN PATENT DOCUMENTS

| | | |
|---|---|---|
| WO | 2007103195 A2 | 9/2007 |
| WO | 2010029794 A1 | 3/2010 |

OTHER PUBLICATIONS

Author Unknown, "Loop Transformations", Computer Science:Indiana University, printed from https://www.cs.indiana.edu/~achauhan/Teaching/ . . . /27-loop-transformations.html on Aug. 15, 2017.

Author Unknown, "Theory and Practice of Dependence Testing", printed from https://www.cs.fsu.edu/~engelen/courses/COP5622/LectureDD.ppt on Aug. 15, 2017.

Author Unkonwn, "Dependence: Theory and Practice", printed from https://www.cs.rice.edu/~ken/comp515/lectures/Ch02DependenceSlides.ppt on Aug. 15, 2017.

Rohou et al., "Vectorization Technologn to Improve Interpreter Performance", ACM Transactions on Architecture and Code Optimization, vol. 9, No. 4, Article 26, Jan. 2013.

Ziantz, LH. et al.; "Run-time optimization of sparse matrix-vector multiplication on SIMD machines"; PARLE '94. Parallel Architectures and Languages Europe. 6th International PARLE Conference Proceedings, pp. 313-322, 1994.

(56) References Cited

OTHER PUBLICATIONS

Software Patent Institute et al.; "Measuring User Programs for a SIMD Processor"; an IP.com Prior Art Database Technical Disclosure; http://ip.com/IPCOM/000150988; Apr. 19, 2007.
Software Patent Institute et al.; "Compiling Ordinary Programs for Execution on an Asynchronous Multiprocessor"; an IP.com Prior Art Database Technical Disclosure; http://ip.com/IPCOM/000148160; Apr. 12, 2007.
Brevnov et al., "Writing a Bi-Endian Compiler", Dr. Dobb's, The World of Software Development, Jul. 2, 2012.
Rajamohan, Srijith, "A Neural Network Based Classifier on the Cell Broadband Engine", The Pennsylvania State University, Aug. 2009.
Bailey et al., "Processor-Centric Design: Processors, Multi-Processors, and Software", Chapter 6 of ESL Models and their Applications, Embedded Systems, 2010.
Ren, Gang, "Compiling Vector Programs for SIMD Devices", Dissertation, University of Illinois at Urbana-Champaign, 2006, retrieved from the Internet: <URL:https://www.ideals.illinois.edu/handle/2142/11226>.
Burger et al., The SimpleScalar tool set, version 2.0., [Online] 1997, ACM SIGARCH Computer Architecture News 25.3 (1997), [Retrieved from the Internet] <http://dx.doi.org/10.1145/268806.268810> pp. 13-25.
Watson et al., The architecture of a parallel relative debugger, [Online] 2000, Proceedings of the 13th International Conference on Parallel and Distributed Computer Systems. 2000, [Retrieved from the Internet] <http://citeseerx.ist.psu.edu/viewdoc/download?doi=10.1.1.444. 7514&rep=rep1 &type=pdf> 8 pages total.
Kim et al., "Flow Precedence Analysis for Optimizing Compilers", Technical Disclosure, IP.com IPCOM000082549, Dec. 1, 1974.
Coding for NEON—Part 5: Rearranging Vectors, Arm Connected Community, 2013, 8 pages, [retrieved on Nov. 23, 2016], Retrieved from the Internet: <URL:https://web.archive.org/web/20131203234257/http://community.arm.com/groups/processors/blog/2012/03/13/coding-for-neon—part-5-rearranging-vectors>.
Lee et al., Single-Cycle Bit Permutations with MOMR Execution, Journal of Computer Science and Technology, Sep. 2005, vol. 20, Issue 5, pp. 577-585, [retrieved on May 13, 2016], Retrieved from the Internet: <URL:http://link.springer.com/article/10.1007/s11390-005-0577-0>.
Shen et al., Implicit Data Permutation for SIMD Devices, 4th International Conference on Embedded and Multimedia Computing, 2009, 6 pages, [retrieved on May 13, 2016], Retrieved from the Internet: <URL:http://ieeexplore.ieee.org/>.
Lokhmotov et al., Optimal bit-reversal using vector permutations, Proceedings of the nineteenth annual ACM symposium on Parallel algorithms and architectures, 2007, pp. 198-199, [retrieved on Nov. 23, 2016], Retrieved from the Internet: <URL:http://dl.acm.org/>.

* cited by examiner vector signed long a, b;
...
a = b;

vload t1 = a
vreverse t2 = t1
vreverse t3 = t2
vstore b = t3 vload t1 = a
vcopy t3 = t1
vstore b = t3 vload t = a
vstore b = t

| | 600 |
|---|---|
| Vector Optimization Rules | |
| Eliminate Unneeded vreverse Operations when One vreverse Operation Feeds Another vreverse Operation | 610 |
| For Computation where All Operations Performed on Input Vectors are Pure SIMD Instructions, Eliminate Unneeded vreverse Operations in Intermediate Representation | 620 |

```
vload t1 = x
vreverse t2 = t1
vload t3 = z
vreverse t4 = t3
vadd t5 = t2, t4
vload t6 = w
vreverse t7 = t6
vand t8 = t5, t7
vreverse t9 = t8
vstore y = t9
```

```
vload t1 = x
vload t3 = z
vadd t10 = t1, t3
vload t6 = w
vand t11 = t10, t6
vstore y = t11
```

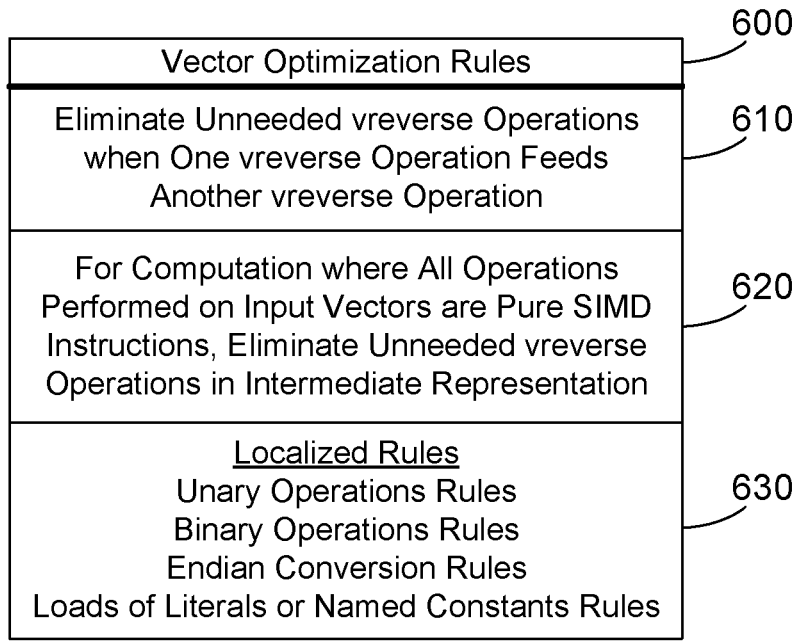

| Vector Optimization Rules | 600 |
|---|---|
| Eliminate Unneeded vreverse Operations when One vreverse Operation Feeds Another vreverse Operation | 610 |
| For Computation where All Operations Performed on Input Vectors are Pure SIMD Instructions, Eliminate Unneeded vreverse Operations in Intermediate Representation | 620 |
| Localized Rules<br>Unary Operations Rules<br>Binary Operations Rules<br>Endian Conversion Rules<br>Loads of Literals or Named Constants Rules | 630 |

FIG. 15 unaryop y = x
vreverse z = y

⟷ vreverse y = x
unaryop z = y

FIG. 16  Prior Art    FIG. 17  Prior Art vreverse t1 = x
vreverse t2 = y
binaryop z = t1,t2

⟶ binaryop t4 = x,y
vreverse z = t4

FIG. 18  Prior Art    FIG. 19  Prior Art lvx + vreverse4x4   ⟷   lvxw4x
lvx + vreverse2x8   ⟷   lxdv2x
vreverse4x4 + stvx  ⟷   stvxw4x
vreverse2x8 + stvx  ⟷   stvxd2x vload t1 = literal
vreverse t2 = t1   ⟷   vload t2 = vreverse(literal)

mA = [0,1,2,3] and mB = [4,5,6,7]

```
1: lxvd2x    A, b1, i1    # A = [2, 3, 0, 1]
2: xxswapd   A, A         # A = [0, 1, 2, 3]
3: lvx       B, b2, i2    # B = [4, 5, 6, 7]
4: vadduwm   R, A, B      # R = [4, 6, 8, 10]
5: xxswapd   R, R         # R = [8, 10, 4, 6]
6: stxvd2x   R, b3, i3    # mR = [4, 6, 8, 10]
```

FIG. 28

```
1: lxvd2x    A, b1, i1    # A = [2, 3, 0, 1]
2: lvx       B, b2, i2    # B = [4, 5, 6, 7]
3: xxswapd   B, B         # B = [6, 7, 4, 5]
4: vadduwm   R, A, B      # R = [8, 10, 4, 6]
5: stxvd2x   R, b3, i3    # mR = [4, 6, 8, 10]
```

FIG. 29 mA = [0,1,2,3] and mB = [4,5,6,7]

```
1: lxvd2x    A, b1, i1    # A = [2, 3, 0, 1]
2: xxswapd   A, A         # A = [0, 1, 2, 3]
3: lxvd2x    B, b2, i2    # B = [6, 7, 4, 5]
4: xxswapd   B, B         # B = [4, 5, 6, 7]
5: vadduwm   R, A, B      # R = [4, 6, 8, 10]
6: stvx      R, b3, i3    # mR = [4, 6, 8, 10]
```

FIG. 30

```
1. lxvd2x    A, b1, i1    # A = [2, 3, 0, 1]
2. lxvd2x    B, b2, i2    # B = [6, 7, 4, 5]
3. vadduwm   R, A, B      # R = [8, 10, 4, 6]
4. xxswapd   R, R         # R = [4, 6, 8, 10]
5. stvx      R, b3, i3    # mR = [4, 6, 8, 10]
```

FIG. 31 mA = [0,1,2,3], mB = [4,5,6,7] and mC = [0,0,0,-1]
((b2) + (i2)) modulo 16 = 12

1. lxvd2x    A, b1, i1      # A = [2, 3, 0, 1]
2. xxswapd   A, A           # A = [0, 1, 2, 3]
3. lvewx     B, b2, i2      # B = [X, X, X, 7]
4. lxvd2x    C, b3, i3      # C = [0, -1, 0, 0]
5. xxswapd   C, C           # C = [0, 0, 0, -1]
6. xxland    B, B, C        # B = [0, 0, 0, 7]
7. vadduwm   R, A, B        # R = [0, 1, 2, 10]
8. xxswapd   R, R           # R = [2, 10, 0, 1]
9. stxvd2x   R, b4, i4      # mR = [0, 1, 2, 10]

FIG. 32

1. lxvd2x    A, b1, i1      # A = [2, 3, 0, 1]
2. lvewx     B, b2, i2      # B = [X, X, X, 7]
3. xxswapd   B, B           # B = [X, 7, X, X]
4. lxvd2x    C, b3, i3      # C = [0, -1, 0, 0]
5. xxland    B, B, C        # B = [0, 7, 0, 0]
6. vadduwm   R, A, B        # R = [2, 10, 0, 1]
7. stxvd2x   R, b4, i4      # R = [0, 1, 2, 10]

FIG. 33 mA = [0,1,2,3], mB = [4,5,6,7] and mR = [20,40,60,80]
((b3) + (i3)) modulo 16 = 12

1. lxvd2x    A, b1, i1      # A = [2, 3, 0, 1]
2. xxswapd   A, A           # A = [0, 1, 2, 3]
3. lxvd2x    B, b2, i2      # B = [6, 7, 4, 5]
4. xxswapd   B, B           # B = [4, 5, 6, 7]
5. vadduwm   R, A, B        # R = [4, 6, 8, 10]
6. stvewx    R, b3, i3      # mR = [20, 40, 60, 10]

FIG. 34

1. lxvd2x    A, b1, i1      # A = [2, 3, 0, 1]
2. lxvd2x    B, b2, i2      # B = [6, 7, 4, 5]
3. vadduwm   R, A, B        # R = [8, 10, 4, 6]
4. xxswapd   R, R           # R = [4, 6, 8, 10]
5. stvewx    R, b3, i3      # mR = [20, 40, 60, 10]

FIG. 35 mA = [0,1,2,3], mB = [4,5,6,7]

1. lxvd2x     A, b1, i1      # A = [2, 3, 0, 1]
2. xxswapd    A, A           # A = [0, 1, 2, 3]
3. lxvd2x     B, b2, i2      # B = [6, 7, 4, 5]
4. xxswapd    B, B           # B = [4, 5, 6, 7]
5. xxspltw    B, B, 3        # B = [7, 7, 7, 7]
6. vadduwm    R, A, B        # R = [7, 8, 9, 10]
7. xxswapd    R, R           # R = [9, 10, 7, 8]
8. stxvd2x    R, b3, i3      # mR = [7, 8, 9, 10]

FIG. 36

1. lxvd2x     A, b1, i1      # A = [2, 3, 0, 1]
2. lxvd2x     B, b2, i2      # B = [6, 7, 4, 5]
3. xxspltw    B, B, 1        # B = [7, 7, 7, 7]
4. vadduwm    R, A, B        # R = [9, 10, 7, 8]
5. stxvd2x    R, b3, i3      # mR = [7, 8, 9, 10]

FIG. 37

COMPILER OPTIMIZATIONS FOR VECTOR OPERATIONS THAT ARE REFORMATTING-RESISTANT

BACKGROUND

1. Technical Field

This disclosure generally relates to computer systems, and more specifically relates to compilers that generate executable code for computer systems.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have from tens of thousands to many millions of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the number, arrangement and type of instructions within the computer program. Many different optimizations have been developed so the code produced by compilers has better run-time performance.

BRIEF SUMMARY

An optimizing compiler includes a vector optimization mechanism that optimizes vector operations that are reformatting-resistant, such as source instructions that do not have a corresponding reformatting operation, sink instructions that do not have a corresponding reformatting operation, a source instruction that is a scalar value, a sink instruction that may produce a scalar value, and an internal operation that depends on lanes being in a specified order. The ability to optimize vector instructions that are reformatting-resistant reduces the number of operations to improve the run-time performance of the code.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 11 shows the table 600 in FIG. 6 with an added vector optimization rule;

FIG. 12 is a diagram showing a sample snippet of code processed by a compiler;

FIG. 13 is a diagram showing instructions generated by the compiler as a result of processing the instructions in FIG. 12;

FIG. 14 is a block diagram illustrating a compiler optimization for the instructions in FIG. 13;

FIG. 15 shows the table 600 in FIGS. 6 and 11 with localized vector optimization rules;

FIG. 16 is a diagram showing a sample snippet of code processed by a compiler;

FIG. 17 is a diagram showing instructions generated by the compiler as a result of processing the instructions in FIG. 16;

FIG. 18 is a block diagram showing a sample snippet of code processed by a compiler;

FIG. 19 is a diagram showing instructions generated by the compiler as a result of processing the instructions in FIG. 18;

FIG. 28 is a sample snippet of code that includes a source without a corresponding reformatting operation;

FIG. 29 is a diagram showing instructions generated by the compiler as a result of processing the instructions in FIG. 28;

FIG. 30 is a sample snippet of code that includes a sink without a corresponding reformatting operation;

FIG. 31 is a diagram showing instructions generated by the compiler as a result of processing the instructions in FIG. 30;

FIG. 32 is a sample snippet of code that includes a source as a scalar value;

FIG. 33 is a diagram showing instructions generated by the compiler as a result of processing the instructions in FIG. 32;

FIG. 34 is a sample snippet of code that includes a sink that may produce a scalar value;

FIG. 35 is a diagram showing instructions generated by the compiler as a result of processing the instructions in FIG. 34;

FIG. 36 is a sample snippet of code that includes an internal operation that depends on lanes being in a specified order; and FIG. 37 is a diagram showing instructions generated by the compiler as a result of processing the instructions in FIG. 36.

DETAILED DESCRIPTION

Figure 1:
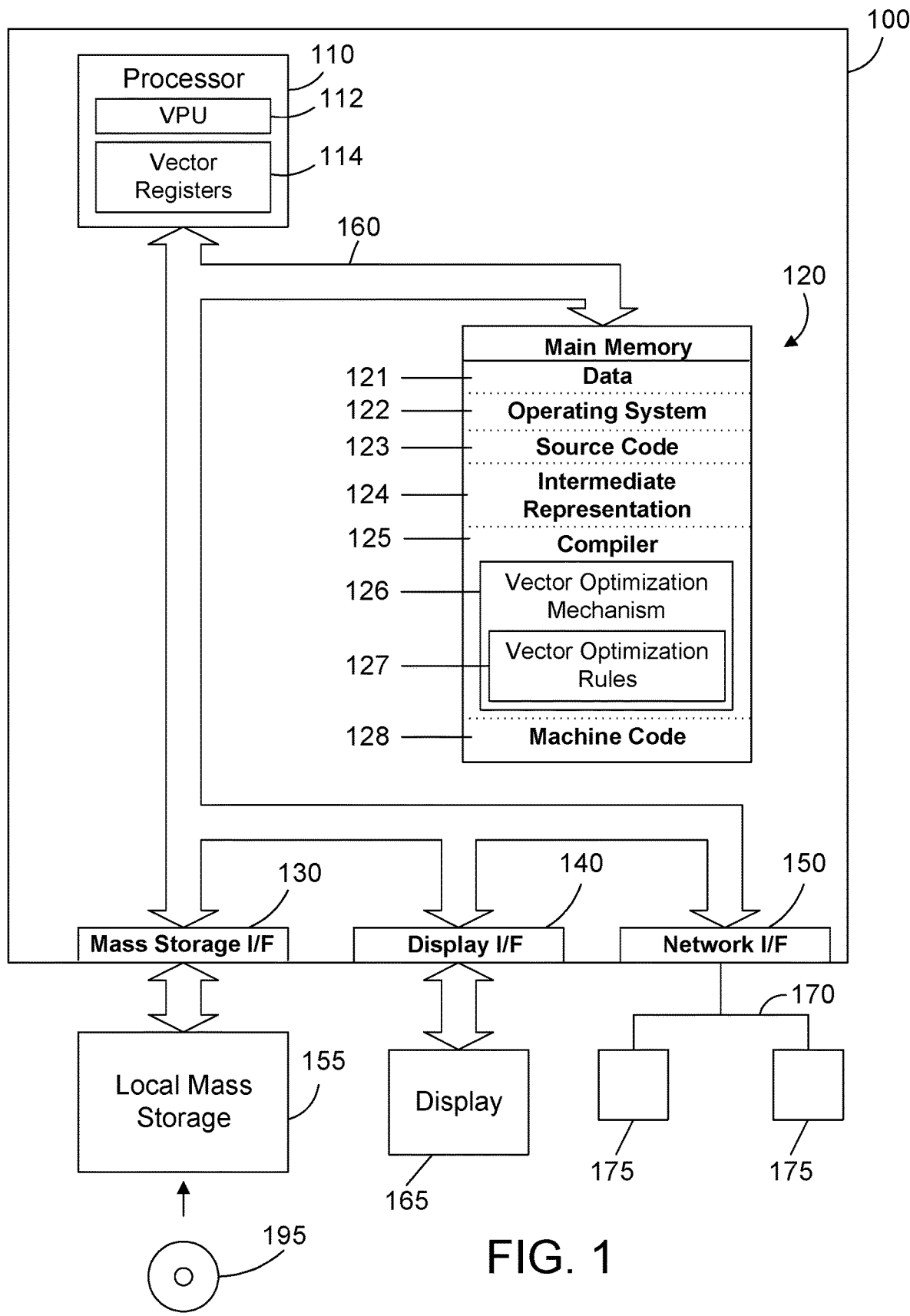
FIG. 1 is a block diagram of an apparatus that includes a vector optimization mechanism in a compiler.

Exploiting opportunities for parallel computation is very important for modern computing systems. One of the most common opportunities for parallel computation arises when the same operation is to be performed on an array (or "vector") of homogeneous data elements. Today's processor instruction set architectures (ISAs) usually include a set of single-instruction, multiple-data (SIMD) instructions that can operate on 2, 4, 8, 16, or 32 values simultaneously. SIMD instructions are examples of what are more broadly termed vector instructions as used herein. For example, the Power ISA currently defines the Vector Add Floating-Point (vaddfp) instruction. This instruction operates on 128-bit vector registers, whose contents are interpreted as four 32-bit floating-point values. The corresponding values in each input register are added together and placed in the corresponding position in the output register. Thus four additions are performed using a single instruction.

Another aspect of today's processors is the concept of "endianness." This refers to how the processor stores bytes of a multi-byte value in memory. For example, a 64-bit integer in a machine register contains 8 bytes, arranged from most-significant byte (MSB) containing the bits representing the largest portions of the integer, to the least-significant byte (LSB) containing the bits representing the smallest portions of the integer. On a so-called Big Endian (BE) architecture, the same value is stored in memory with byte 0 containing the MSB, and byte 7 containing the LSB. On a so-called Little Endian (LE) architecture, the value is stored in memory with byte 0 containing the LSB, and byte 7 containing the MSB. These two methods arose for historical performance reasons that no longer matter a great deal, except that in today's world we must deal with these two incompatible views of memory.

BE and LE systems typically view values differently in vector registers as well. When an array of four 32-bit values is loaded into a 128-bit BE vector register, the zeroth element of the array occupies the most significant bytes, while the third element of the array (zero-based indexing) occupies the least significant bytes. When the same array is loaded into a 128-bit LE vector register, the zeroth element of the array occupies the least significant bytes, while the third element of the array occupies the most significant bytes. These are considered to be the "natural element order" for BE and LE memory models. The contents of each 4-byte element are represented in the same fashion on both BE and LE architectures, with the sign bit of the floating-point value placed in the most significant bit of the element.

Some ISAs (Power and ARM, for example) are designed to operate either in Big Endian mode or in Little Endian mode. In the Power ISA, the endian mode is selected with a control bit in the machine state register (MSR). Thus the same instructions are available to carry out computation regardless of endianness. This is of no concern for instructions such as "vaddfp" described above, where the computation is performed uniformly on all elements of the instruction's input and output registers. However, when an instruction implicitly or explicitly refers to the element numbering within a vector register, the numbering that is natural for one endianness is unnatural for the other.

In some cases, an ISA may provide instructions to facilitate maintaining elements in vectors using a particular element order, regardless of the endian mode specified by the programmer. For example, the Load VSX Vector Doubleword*2 Indexed (lxvd2x) instruction in the Power ISA specifically loads elements into a vector register using the BE natural element order, whether or not the machine is using the BE memory model or the LE memory model. Similarly, the Store VSX Vector Doubleword*2 Indexed (stxvd2x) instruction reverses this transformation, storing to memory as though the elements in the vector register use the BE natural element order. Using these instructions allows a programmer to ignore the actual endian memory model in use, for a subset of data types and instructions. Data within each element are formatted in memory based on the selected endian model, e.g., in accordance with the mode selected by MSR[LE].

An instruction that regards vector elements in vector registers using BE natural element order is said to have a BE vector element endian bias. Conversely, an instruction that regards vector elements in vector registers using LE natural element order is said to have an LE vector element endian bias. When the preponderance of vector instructions in an ISA have the same endian bias, this is referred to as the inherent endian bias of the ISA.

Figure 2:
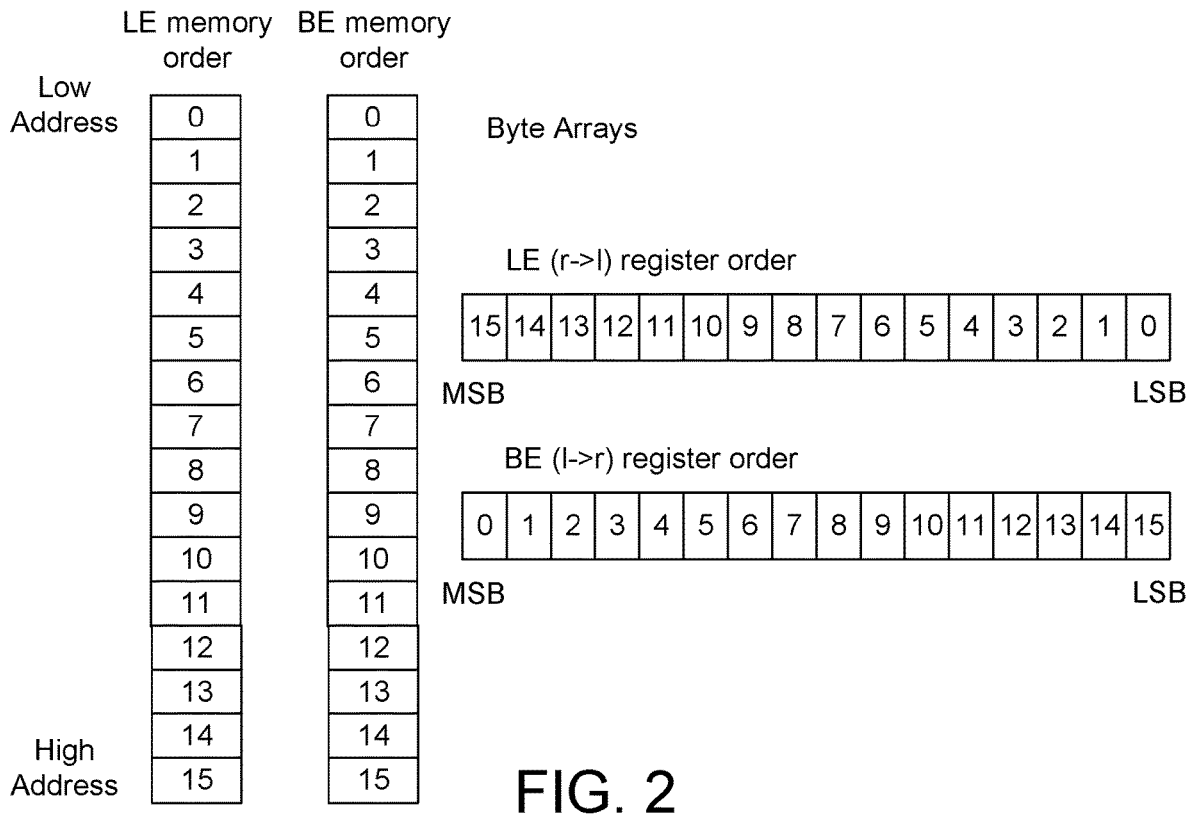
FIG. 2 is a block diagram illustrating how a byte array is stored in little endian and big endian systems.
Figure 3:
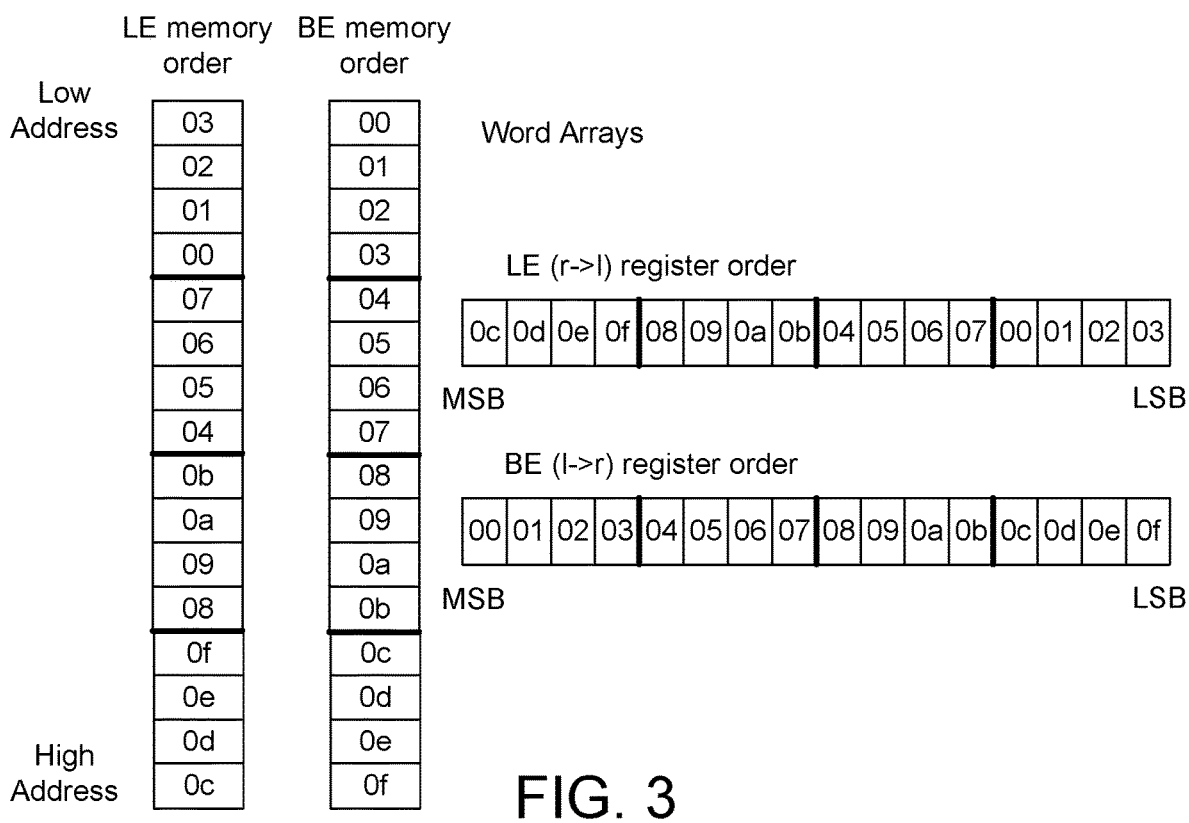
FIG. 3 is a block diagram illustrating how a word array is stored in little endian and big endian systems.

FIGS. 2 and 3 show examples of how data arrays may be represented in memory, using big-endian and little-endian data representation, and how they may be represented in vector registers, using l→r and r→l element ordering. In FIG. 2, an array of bytes containing {0,1, ..., 15} is shown. Since each vector element is one byte long, the little-endian (LE) and big-endian (BE) representations in memory are identical, with the first element stored in the lowest address. Using r→l element ordering (LE), the first element is stored in the least significant byte (LSB) of the vector register; while using l→r element ordering (BE), the first element is stored in the most significant byte (MSB).

FIG. 3 shows representations for an array of 4-byte integers, containing {0x00010203, 0x04050607, 0x08090a0b, 0x0c0d0e0f}. In memory, elements appear in ascending address order for both BE and LE, but the byte order within each element differs. In registers, the opposite is true: the elements appear from right to left using r→l order (LE) and from left to right using l→r order (BE), but within each element the byte ordering is identical. Thus, we see the 4-byte integer stored in the least significant four bytes of the LE register are the same order, namely 00, 01, 02, 03 as the 4-byte integer stored in the most significant four bytes of the BE register. The order that changes is the order of elements, not the order of bytes within the elements.

There are known ways for a compiler to insert one or more vector element reverse operations into a computer program to account for a mismatch in endian bias. For example, the following pending patent applications disclose ways to insert vector element reverse operations into a computer program: U.S. Ser. No. 14/576,391 filed on Dec. 19, 2014; U.S. Ser. No. 14/583,674 filed on Dec. 27, 2014; U.S. Ser. No. 14/576,710 filed on Dec. 19, 2014; and U.S. Ser. No. 14/583,691 filed on Dec. 27, 2014. The addition of vector element reverse operations reduces performance of the code, but assures correct operation. The disclosure herein is directed to a compiler that analyzes the code for reformatting-resistant operations, and performs optimizations on reformatting-resistant operations that could not be optimized using the prior art techniques disclosed in the prior art referenced above.

An optimizing compiler as disclosed and claimed herein includes a vector optimization mechanism that optimizes vector operations that are reformatting-resistant, such as source instructions that do not have a corresponding reformatting operation, sink instructions that do not have a corresponding reformatting operation, a source instruction that is a scalar value, a sink instruction that may produce a scalar value, and an internal operation that depends on lanes being in a specified order. The ability to optimize vector instructions that are reformatting-resistant reduces the number of operations to improve the run-time performance of the code.

Referring to FIG. 1, a computer system 100 is one suitable implementation of a server computer system that includes a compiler with a vector optimization mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, source code 123, an intermediate representation 124, a compiler 125, and machine code 128. Data 121 represents any data that serves as input to or output from any program in computer system 100. Operating system 122 is a multitasking operating system. There are three different representations of a computer program in FIG. 1, namely the high-level source code 123, the intermediate representation 124 that is generated by a front-end compiler from the source code 123, and the machine code 128 that is generated by a back-end compiler from the intermediate representation 124. The vector optimization mechanism 126 disclosed herein could be implemented within a front-end compiler, within a back-end compiler, or different aspects of the vector optimization mechanism 126 could be implemented in both a front-end compiler and a back-end compiler. The compiler 125 thus could represent either a front-end compiler, a back-end compiler, or a full compiler that includes a front-end and a back-end. The compiler 125 includes the vector optimization mechanism 126 that optimizes vector instructions according to defined vector optimization rules 127.

Note the source code 123, intermediate representation 124, compiler 125, and machine code 128 are all shown residing in memory 120 for the convenience of showing all of these elements in one drawing. One skilled in the art will appreciate that this is not the normal mode of operation for most compilers. A front-end compiler processes source code 123 and generates therefrom intermediate representation 124. This processing may occur on a computer system separate from computer system 100. A back-end compiler processes intermediate representation 124 and generates therefrom machine code 128, which may also occur on a separate computer system. Compiler 125 could be a front-end compiler, or could be a compiler that includes both a front end and a back end. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. A back-end compiler could be executed on a fourth computer system, which reads the intermediate representation 124 from the third computer system, and generates therefrom machine code 128, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above. In addition, the vector optimization mechanism 126 can include different portions implemented in different parts of the compiler.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, source code 123, intermediate representation 124, compiler 125, and machine code 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 125. Processor 110 preferably includes a vector processing unit (VPU) 112 and multiple vector registers 114. The VPU 112 and vector registers 114 allow the processor to execute Single Instruction Multiple Data (SIMD) instructions, which are examples of vector instructions discussed herein.

Although computer system 100 is shown to contain only a single processor and a single system bus, those skilled in the art will appreciate that a compiler as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
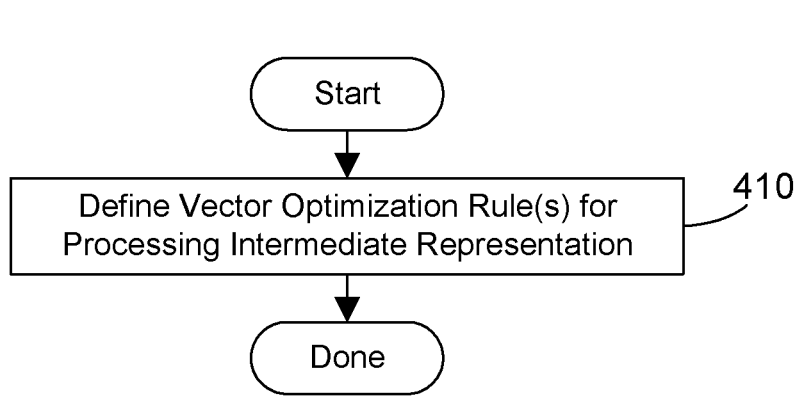
FIG. 4 is a flow diagram of a method for defining vector optimization rules for a compiler to optimize vector instructions.
Figure 5:
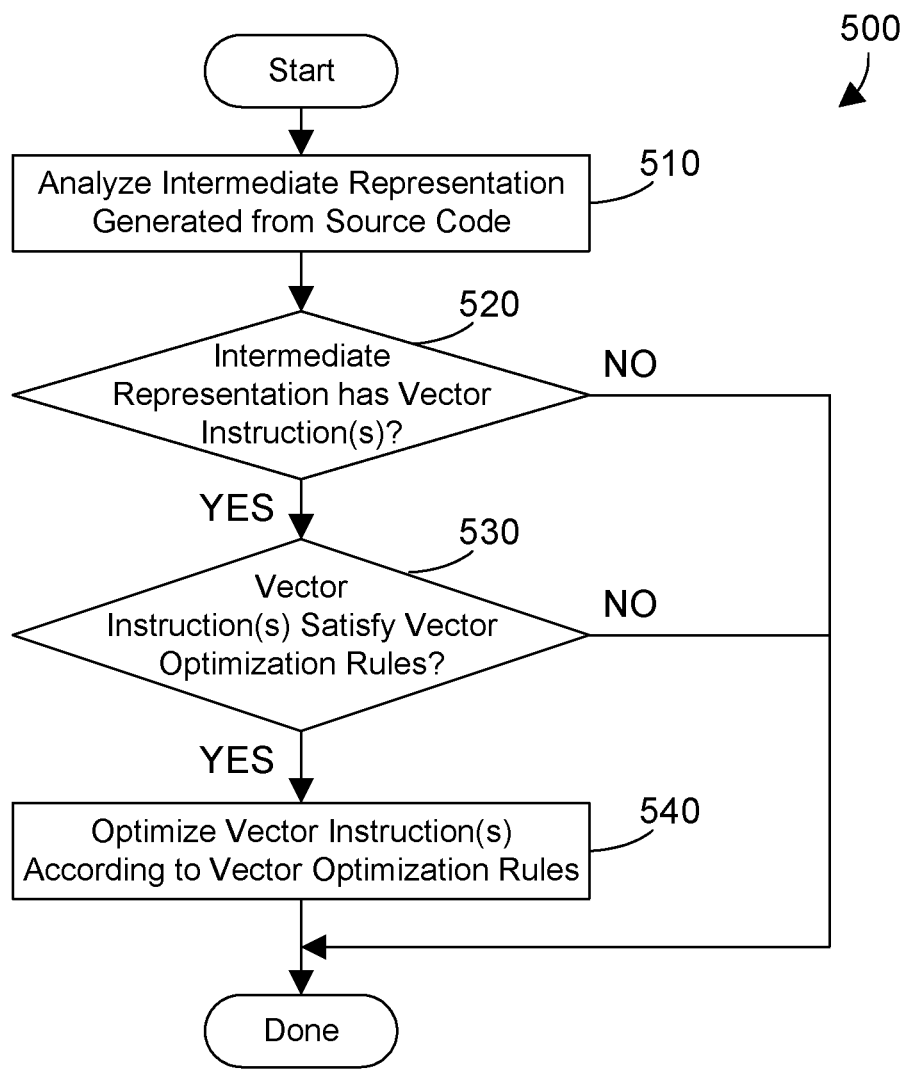
FIG. 5 is a flow diagram of a method for a compiler to optimize vector instructions according to defined vector instruction processing rules.

Referring to FIG. 4, method 400 defines one or more vector optimization rules for processing an intermediate representation of the code (step 410). The vector optimization rules defined in step 410 correspond to vector optimization rules 127 shown in FIG. 1. A method 500 shown in FIG. 5 analyzes the intermediate representation generated from the source code (step 510). When the intermediate representation has no vector instructions (step 520=NO), method 500 is done. When the intermediate representation has one or more vector instructions (step 520=YES), but the vector instruction(s) do not satisfy the vector optimization rules (step 530=NO), method 500 is done. When the vector instruction(s) satisfy the vector optimization rules (step 530=YES), the vector instruction(s) are optimized according to the vector optimization rules (step 540). The optimization in step 540 can include, for example, eliminating one or more vector element reverse operations. Various examples are now presented to illustrate different optimizations that could be performed in step 540.

Figures 6, 7, 8, 9, 10:
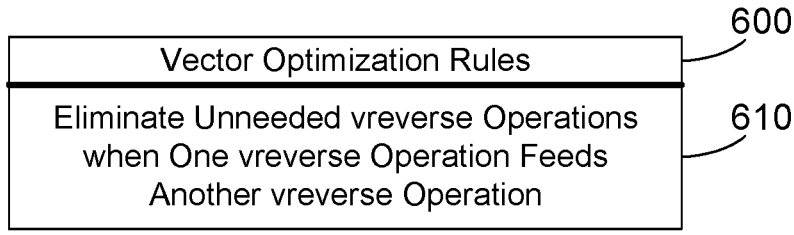
FIG. 6 is a diagram of a table that shows an example of the vector instruction processing rules shown in FIG. 1.
FIG. 7 is a diagram showing a sample snippet of code processed by a compiler.
FIG. 8 is a diagram showing instructions generated by the compiler as a result of processing the instructions in FIG. 7.
FIG. 9 is a block diagram illustrating a first possible compiler optimization for the instructions in FIG. 8.
FIG. 10 is a block diagram illustrating a second possible compiler optimization for the instructions in FIG. 9.

An example of a vector optimization rule 127 shown in FIG. 1 is shown in FIG. 6. For all vector copy operations, the unneeded vector element reverse (vreverse) operations in the intermediate representation are eliminated, as shown at 610.

The disclosure and claims herein provide a way for a compiler to mitigate the performance cost of added vector element reverse operations, such as vector element reverse operations added by the compiler after vector load instructions and before vector store instructions. In this disclosure, we refer to any vector load instruction (whether biased-endian like "lxvd2x", or natural-endian like "lvx") as a vload, and similarly refer to any vector store instruction as a vstore. We will also refer to any operation that reverses the elements of a vector register as a vreverse, and to an instruction that copies the contents of one register into another as a vcopy. However, the methods described herein are equally applicable regardless of the kinds of loads, stores, and reverse operations employed.

A "vreverse operation" generally refers to a series of one or more instructions that reverses the order of elements in a vector register. There are different vreverse operations for each element size (1 byte, 2 bytes, 4 bytes, 8 bytes, 16 bytes, etc.). An ISA may, but need not, include machine instructions that map directly to vreverse operations of every size. Alternatively, more general instructions (such as permutes or shuffles) may be used instead.

In the most preferred implementation, there are preferably different vector element reverse instructions for each different element size that can be specified in an instruction set. Thus, if a system defines vectors with element sizes of bytes, halfwords (2 bytes), words (4 bytes) and doublewords (8 bytes), there will be a different vector element reverse instruction for each of these. For example, a byte vector element reverse instruction could be vreverse. A halfword vector element reverse instruction could be vreverse_hw. A word vector element reverse instruction could be vreverse_w. A double word vector element reverse instruction could be vreverse_dw. Of course, any suitable syntax could be used, and any suitable number of vector element reverse instructions could be defined, depending on the element sizes defined by the instruction set, whether currently known or developed in the future. For example, a quadword vector element reverse instruction could be defined and vector element reverse instructions for elements larger than quadwords could also be defined. For the simplicity of the examples herein, the size of the vector element reverse instruction is not specified, realizing that the size could vary as described above.

The compiler optimizations disclosed herein may be performed during any appropriate stage of the compilation process. A compiler operates on one or more intermediate representations of code, which may be organized in various ways that may be more or less appropriate to a particular optimization. For example, an intermediate representation may represent expressions in a tree or directed-acyclic graph (DAG) form, or may use a variant of three-address code. Of course, many more variations are possible, whether currently known or developed in the future. This disclosure applies regardless of the chosen intermediate representation and without regard to specific unimportant details of how the optimizations are implemented.

In the simplest case, it is common for a vector to be copied from one memory location to another, such as shown in FIG. 7. Using various methods, including the methods disclosed in the previously-filed applications cited above, the compiler could generate for the code in FIG. 7 the instructions shown in FIG. 8, where t1, t2, and t3 are vector registers. The effect of each vreverse is to reverse the order of the elements in the vector register. We assume for this example the vreverse t2=t1 instruction was added by the compiler to reverse the order of the vector elements after the vload t1=a instruction, and the vreverse t3=t2 instruction was added by the compiler to reverse the order of the vector elements before the vstore b=t3 instruction. Thus the first vreverse will reverse the elements, and the second vreverse will restore them to their original locations. If the value of t2 is not used anywhere else, the compiler may replace the instructions shown in FIG. 8 with the instructions shown in FIG. 9. Then, standard compiler optimizations known as copy propagation and/or value numbering can reduce the instructions in FIG. 9 to the instructions shown in FIG. 10. Note that all vreverse operations have been removed, so there is now no performance penalty.

More specifically, an exemplary compiler performing an exemplary translation of the code of FIG. 7 described in conjunction with these rules may generate assembly code corresponding to FIG. 8 for a little-endian environment in accordance with the instructions for POWER8 as follows:

lxvd2x0,0,4
    xxpermdi 0,0,0,2
    xxpermdi 0,0,0,2
    stxvd2x0,0,3

In accordance with one exemplary implementation of the present invention, when the optimizations described herein are performed, an exemplary compiler may generate code corresponding to FIG. 10 for a little-endian environment in accordance with the POWER8 instruction set as follows:

lxvd2x0,0,4
    stxvd2x0,0,3

Note that a code sequence where one vreverse operation feeds another vreverse operation for elements of the same size can arise in other contexts than a vector copy. For example, the optimization rules in rule 620 of FIG. 11 may introduce such a code sequence. At any time such a code sequence is introduced, every use of the result of the second vreverse operation may be replaced with the input to the first vreverse operation, and the second vreverse operation may be removed. If the result of the first vreverse operation is not used elsewhere, it may also be removed.

Recall that a vreverse operation may not be implemented as a single instruction. For example, the Power ISA implemented by the POWER8 processor does not include single instructions corresponding to vreverse operations for elements of size 1, 2, or 4 bytes. Consequently, a vector load of a data type such as vector char, vector short, vector int, or vector float is often implemented using a sequence of a vector load of two doublewords followed by a permute that reverses the elements, and a vector store of such a data type is often implemented using a sequence of a vector store of two doublewords preceded by a permute that reverses the elements.

Suppose a and b in FIG. 7 are of type vector signed int, rather than vector signed long. In accordance with one embodiment, this may be translated into a sequence similar to that of FIG. 8, but due to the lack of a suitable vreverse instruction for vector word elements, the generated sequence would be more expensive:

vload t1=a
    vload rev_w=<control vector to reverse word elements>
    vperm t2, t1, rev_w
    vperm t3, t2, rev_w
    vstore t3

As can be seen, this sequence requires an additional load of a vector permute control vector that instructs a permute instruction to reverse the word elements of a vector registers. Furthermore, using the POWER8 instruction set, only a subset of the vector registers may be used to perform a vector permute instruction, which may lead to additional register copy instructions, data spills to memory, and so forth.

In accordance with one optimized embodiment, the vector word copy sequence is translated into an intermediate representation which may load words with an element order of element 1, element 0, element 3, element 2 (denoted hereafter by vload_w1032) and use a suitable big-endian permutation (2,3,0,1) to create the "normal" little-endian order (3,2,1,0), and the converse operations for a vector store. This provides the following initial translation to an intermediate representation:

vload_w1032 t1=a
    vperm_w2301 t2=t1
    vperm_w2301 t3=t2
    vstore_w1032 b=t3

Advantageously, vload_w1032 may be implemented by an lxvd2x instruction, vperm_2301 may be implemented by an xxpermdi instruction, and vstore_w1032 may be implemented by an stxvd2x instruction. This yields the following improved copy sequence:

lxvd2x0,0,4
    xxpermdi 0,0,0,2
    xxpermdi 0,0,0,2
    stxvd2x0,0,3

Note that, although we are using it on a vector of words, vperm_w2301 is actually a vreverse operation for doublewords. Thus in accordance with the teachings herein, since the first vperm_w2301 instruction feeds the second vperm_w2301 instruction, and the result of the first vperm_w2301 instruction is not used elsewhere, the two vperm_w2301 instructions may be removed as above, yielding:

vload_w1032 t1=a
    vstore_w1032 b=t1

This final intermediate representation may then be translated to the following code to copy a vector of word elements:

lxvd2x0,0,4
    stxvd2x0,0,3

FIG. 11 shows the table 600 of vector optimization rules that includes an additional rule 620 that states that for computations where all operations performed on input vectors are pure SIMD instructions, eliminate the unneeded vector element reverse operations in the intermediate representation. Suppose we have a computation where all operations performed on the input vectors are pure SIMD instructions; that is, the instructions perform parallel computations on the corresponding elements of all input vectors independently. In this case, the relative order of elements within the registers will not affect the final results as long as it is consistent, and we can avoid vreverse operations for the entire sequence. A sample source statement is shown in FIG. 12. Letting vadd represent vector addition and vand represent vector bit-wise AND, the compiler could generate the code shown in FIG. 13, where t1 through t9 are vector registers. If the compiler recognizes that none of the reversed values t2, t4, t5, t7, and t8 is used outside this sequence, then the entire sequence can be converted to the instructions shown in FIG. 14. One way to implement this is to first apply the rule from the example shown in FIGS. 18 and 19, below, to the vadd, then apply the same rule to the vand, and finally apply the rule from the example in FIGS. 7-10. Another possible implementation is to analyze webs of computation where all sources originate from loads after which vector element reverse operations have been added and all sinks flow into stores before which vector element reverse operations have been added. The former is simpler to implement and faster to optimize, while the latter is more general and can be performed on computations that contain loops. Any implementation in which the instructions producing intermediate results and other instructions consuming those intermediate results are identified can be used. Examples include the well-known Value Numbering, Value Propagation, Reaching Analysis, Instruction Generation Folding, and Peephole optimizations.

In another aspect of the present invention, using the POWER8 instruction set, the compiler may be presented with a variant of FIG. 13 that operates on a vector of single precision floating-point elements of 4-byte size:

vload_w1032 t1=x
    vperm_w2301 t2=t1 vload_w1032 t3=z
vperm_w2301 t4=t3
vadd_fp t5=t2, t4
vload_w1032 t6=w
vperm_w2301 t7=t6
vand_w t8=t5, t7
vperm_w2301 t9=t8
vstore_w1032 y=t9

In conjunction with the teachings herein, the compiler generates:
vload_w1032 t1=x
vload_w1032 t3=z
vadd_fp t5=t2, t4
vload_w1032 t6=w
vand_w t8=t5, t7
vstore_w1032 y=t9

The intermediate representation may then be translated into the following machine instruction sequence on a POWER8 processor:
lxvd2x0,0,4
lxvd2x1,0,5
xvaddsp 0,0,1
lxvd2x12,0,6
xxland 0,0,12
stxvd2x0,0,9

A variant on the example in FIGS. 11-14 occurs when the compiler automatically generates vector code from scalar code. This "auto-vectorization" optimization may be performed on loops over array elements or on straight-line sections of code that make references to adjacent array elements. The compiler can replace operations on individual array elements with SIMD instructions that operate on several elements in parallel.

When auto-vectorized code is generated, the same sort of transformations can be made as shown in FIGS. 13 and 14. However, it may be easier in some cases for the compiler to recognize these cases. The compiler may generate special symbols or flags associated with vector loads and stores created for auto-vectorization, and thereby know that the vloads and vstores that it generates need not have vreverses inserted.

Even when an entire expression may not be optimized as shown in FIGS. 13-14, subexpressions may be optimized with localized rules. Examples of localized rules are shown at 630 in FIG. 15 to include unary operations rules, binary operations rules, endian conversion rules, and loads of literals or named constants rules. Examples of each of these follow.

For some unary operations such as negate, the instructions in FIG. 16 can be changed to the instructions in FIG. 17, or vice versa. While this does not reduce the number of instructions, the changed order of instructions may result in making optimization possible that was not possible before. For example, if a vector reverse operation preceded the unaryop y=x instruction, switching the order of the instructions as shown in FIG. 17 could result in two consecutive vreverse operations, which could then be optimized by removing the vreverse operations as shown in FIGS. 8-10. Even when the reversal does not allow eliminating a vreverse operation, it may improve performance by allowing one or more other instructions to use the result of the unary operation sooner.

For pure SIMD binary operations, the instructions shown in FIG. 18 could be reduced to the instructions shown in FIG. 19. Conversions between natural-endian loads/stores and biased-endian loads/stores are possible given the correct vreverses for the type. For example, referring to FIGS. 20 and 21, an instruction lvx+vreverse4×4 can be converted to lvxw4x, where "vreverseN×S" represents reversal of a vector having N elements, each of which has size S bytes. An instruction lvx+vreverse2×8 can be converted to lxvd2x. An instruction vreverse4×4+stvx can be converted to stvxw4x. An instruction vreverse2×8+stvx can be converted to stvxd2x. Note that it may also be beneficial to make the reverse transformation, for example, converting a lxvd2x into an lvx+vreverse2×8. If the lxvd2x is itself followed by a vreverse2×8, this will produce back-to-back vreverse2×8 instructions that can then be eliminated as shown in FIGS. 8-10.

Figures 20, 21, 22, 23, 24:
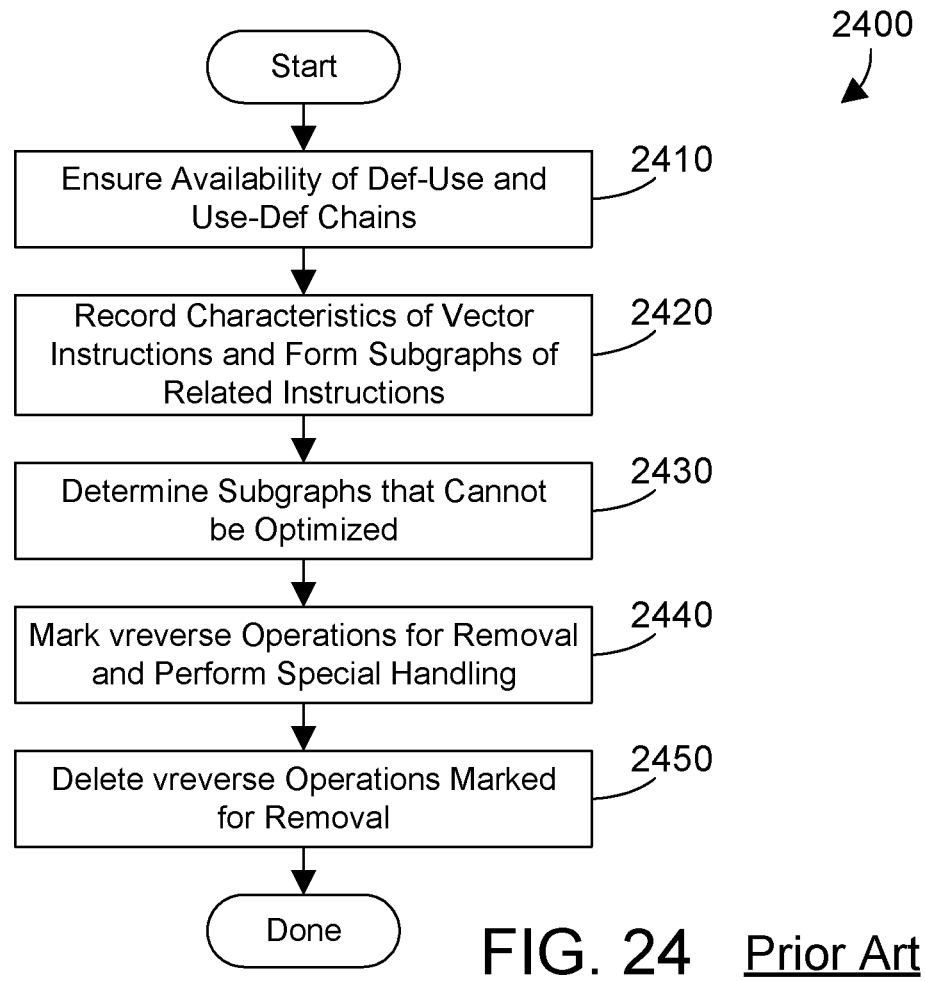
FIG. 20 is a block diagram showing endian-biased instructions with vector element reverse operations.
FIG. 21 is a diagram showing conversion of the multiple instructions in FIG. 20 to a single instruction.
FIG. 22 is a block diagram showing a sample snippet of code processed by a compiler.
FIG. 23 is a diagram showing instructions generated by the compiler as a result of processing the instructions in FIG. 22.
FIG. 24 is a flow diagram of a prior art method for the optimizing compiler shown in FIG. 1 to perform vector optimizations based on vector optimization rules.

For loads of literals or named constants, the two instructions shown in FIG. 22 can be converted to the one instruction shown in FIG. 23, where "vreverse (literal)" represents the vector literal with its elements reversed in memory. In some cases the reverse transformation is also useful, to enable other transformations; for example, so that both inputs to an add are vreverse operations.

As a general rule, combinations of vreverse with binary or unary operations should be transformed first, and combinations of vreverse with loads and stores should be transformed last, in order to maximize other opportunities. These and other transformations may be used to reduce the number of vreverse operations added to the generated code. For instance, there are many rules specific to a particular instruction set architecture that may be applied to optimize combinations of vreverse and other instructions. In some cases another pass over the non-load or store instructions can find more opportunities.

Referring to FIG. 24, a method 2400 shows one possible method that could be performed by the compiler as described herein. The optimization requires pre-computation of def-use and use-def chains (step 2410). This is an industry-standard analysis to produce data structures that represent register relationships between instructions. If an instruction I modifies (defines) a register R, then the def-use chain for (I,R) lists all instructions that consume that definition of R. Also, if an instruction I makes use of a register R, then the use-def chain for (I,R) lists all instructions that could provide the definition of R that I uses. In many optimizers, def-use and use-def chains are maintained throughout the optimization phases. In this case, step 2410 requires no work. Otherwise, step 2410 performs this industry-standard analysis to make the chains available.

Next, step 2420 is performed as follows. The compiler walks through every instruction in the intermediate representation of the current function. For each instruction I, check whether I mentions a vector register. If not, continue to the next instruction. Otherwise, mark I as "relevant." For each use of a register R in I, union {I} with each instruction in the use-def chain for (I,R). For each definition of a register R in I, union {I} with each instruction in the def-use chain for (I,R). If I is a load or store, record that information. If I is a vreverse operation, record that as well. If I is not a vreverse operation, determine whether it is swappable (is not sensitive to element order) or swappable with special handling (is sensitive to element order, but can be modified if its containing subgraph is optimized). Note that an instruction can be both a load or a store, and a vector reverse that indicates a load or store like lxvd2x. If I contains a register use that is live on entry to the function, record that information. If I defines a register that is live on exit from the function, record that information. When step 2420 is finished, the relevant instructions in the function have been partitioned into maximal subgraphs of vector computation.

Each subgraph has a representative instruction, as determined by the classic set-union algorithm.

At this point step 2430 is performed as follows. Walk through each instruction a second time. If anything about the instruction makes the web not optimizable, record this fact in the representative instruction of its subgraph. This includes the instruction being marked live on entry or live on exit, a load or store that is not permuting (and is not swappable with special handling), a permuting load or store that is not accompanied by a register swap, or an instruction that is not marked as either a swap or swappable.

Next, step 2440 is performed as follows. Walk through each instruction a third time, looking for permuting loads and stores that are accompanied by a vector element reverse operation, and whose representative instruction has not been marked as not optimizable. Mark the accompanying vector element reverse operations for future removal. During the same pass, look for instructions that have been marked as swappable with special handling, and whose representative instruction has not been marked as not optimizable. Perform the special handling for these. Examples of special handling include changing the element number on the instruction, such as for a vector-splat, vector-insert or vector-extract operation, changing the element number selectors in a permute or shuffle instruction, changing an instruction operating on even elements, odd elements, upper elements or lower elements to the opposite, converting a non-permuting load or store into a permuting one, and swapping the elements in a constant vector.

Next, step 2450 is performed as follows. Walk through the instructions a fourth time, looking for vector element reverse operations that have been marked for deletion, and replace each of them with a register copy. It is necessary to do this separately from step 2440 because a single swap can be associated with more than one load or store due to other optimizations.

A little terminology is necessary to describe the problem solved by the disclosure and claims herein. First, most SIMD instructions operate on corresponding elements of several input and output registers, where the elements have the same size and type in all input and output registers. We refer to each corresponding set of elements as a lane. For our purposes, a homogeneous operation is such an instruction for which each lane of the vector result depends only upon the corresponding lane of the vector inputs.

Let $f(x,y)$ be a homogeneous operation with N lanes; let p be a formatting operation (or "permute") that reorders N elements to be in possibly different lanes; and let $p^{-1}$ be the inverse formatting operation of p; that is, $p^{-1}$ restores the original order of the N elements. Prior art optimizations have been performed based on the recognition that $p^{-1}(f(p(x),p(y)))=f(x,y)$. More generally, if we have a set of homogeneous operations that form a computation with n inputs (the sources) and m outputs (the sinks), then
$\{r1,r2, \ldots, rm\}=f(x1,x2, \ldots, xn)<==>(p^{-1}(r1), p^{-1}(r2), \ldots, p^{-1}(rm)\}=$
$f(p(x1),p(x2), \ldots, p(xn))$.

That is, for such a computation it is legitimate to remove the reformatting instructions from the entries to and exits from the computation. This will cause the same results to be produced, but the intermediate results will be kept in different lanes of vector registers during the computation, and the execution time of the computation will be reduced. This is covered in the disclosure above with respect to FIGS. 6-24. However, the disclosure in FIGS. 6-24 does not address optimization of more general computations. For example, each of the following presents a problem that would not allow the techniques discussed above with respect to FIGS. 6-24 to remove vreverse instructions:

at least one source may not have a reformatting operation p;

at least one sink may not have a reformatting operation $p^{-1}$;

a source may be a scalar value, rather than a vector value matching the number and type of elements of the rest of the computation;

a sink may produce a scalar value, rather than a vector value matching the number and type of elements of the rest of the computation; and an internal operation (neither a source nor a sink) may depend upon lanes being in a specific order.

For want of a better term, we shall refer to a computation having one or more of the above properties as reformatting-resistant. Although the optimizations discussed above with respect to FIGS. 6-24 capture some of the opportunity for removing formatting operations, a significant fraction of computations are reformatting-resistant. Thus there is a clear need for improved optimization capability that can handle such real-world computations, permitting them to benefit from improved execution time.

Figure 25:
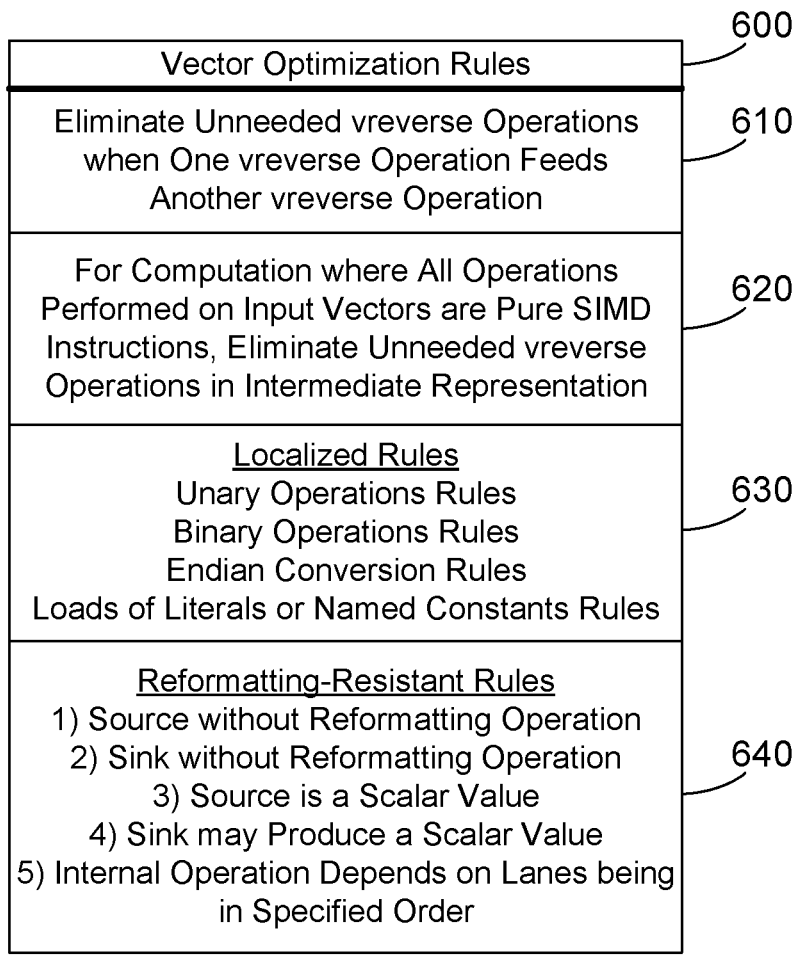
FIG. 25 shows the table 600 in FIGS. 6, 11 and 15 with the addition of reformatting-resistant vector optimization rules.

The disclosure and claims herein provide methods for optimizing reformatting-resistant computations so that the total cost of such computations is reduced. Thus, in accordance with the present invention, the following computations may be optimized:

Sink without inverse reformatting operation:
$f(p(x1), p(x2), p(xn))=>p^{-1}(f(x1, x2, xn))$
Source without reformatting operation:
$p^{-1}(f(p(x1), p(x2), xn))=>f(x1, x2, p^{-1}(xn))$
Source is a scalar value:
$p^{-1}(f(p(x1), p(x2), \ldots s))=>f(x1, x2, \ldots, apply(p^{-1}, s))$
Sink is a scalar value
$s=extract(f(p(x1), p(x2), \ldots, p(xn)), i)=>s=extract(f(x1, x2, \ldots, xn), apply(p^{-1}, i))$
Reduction
$reduce(f(p(x1), p(x2), p(xn)), subset\text{-}selector)=>reduce(f(x1, x2, xn), apply(p^{-1}, subset\text{-}selector))$ In the above, each xi is a vector input, and s is a scalar input or output. The "apply" operation performs a specific adjustment to an input with regards to the inverse reformatting operator $p^{-1}$, in order to correctly adjust the vector element numbers. An "extract" operation produces the i-th scalar element of a vector. A "reduce" operation produces a vector where only a subset of the outputs are defined. For example, this might represent an operation that adds the elements of a source register together and produces the sum in element zero of the result register. In this example, {0} would be the subset-selector; note that a subset-selector may contain more than one vector element index. These five cases discussed in general above result in reformatting-resistant rules 640 as shown in FIG. 25. These are additional vector optimization rules that allow the vector optimization mechanism to perform more optimizations that are not covered by the rules 610, 620 and 630 discussed above.

The disclosure and claims operate on dataflow subgraphs (DFsGs). For our purposes, a dataflow subgraph is a maximal set of related vector instructions, where two instructions are related if one of them writes to a vector register whose contents are subsequently read by the other. For each DFsG, a preferred ordering of the vector elements is maintained throughout the DFsG's computation. It then modifies instructions within the DFsG as necessary in order to maintain that ordering, adjusting the data layout at each source and sink of the DFsG to match the preferred ordering.

In a preferred implementation, the adjusting can be performed by many different operations, such as removing data reorganizations that change the vector data layout from a preferred ordering to a non-preferred ordering at DFsG sources; removing data reorganizations that change the vector data from a non-preferred ordering to a preferred ordering at the DFsG sinks; adding data reorganization from a non-preferred vector data layout to a preferred data layout at DFsG sources; adding data reorganization from a preferred vector data layout to a non-preferred data layout at DFsG sinks; identifying operands that make reference to an element of vector data, when the vector data layout is being changed from a first non-preferred to a second preferred vector data layout, further adjusting such reference in a manner reflective of the reorganization; modifying sinks selecting a subset of data values from the vector data in a first non-preferred vector data layout to select the corresponding data values from a second preferred data layout; identifying DFsG sources or sinks that are transparent to data reorganization, and not modifying data layout at those sources and sinks (optionally further including removing any data reorganization at such sources and sinks); and optionally, performing one of (1) inhibiting a transformation based on determining that a data vector layout reorganization is permissible with respect to the DFsG, internal nodes, or (2) modifying the DFsG internal nodes in view of the vector data reorganization. "Vector data layout" refers to an ordering of vector elements in a vector.

The compiler optimizations disclosed herein are preferably performed based on cost. Cost could be based on any suitable factor or combination of factors, including number of instructions, number of execution cycles, code size in bytes, etc. The disclosure and claims herein expressly extend to any suitable way to calculate cost.

FIG. 25 shows the vector optimization rules 600 additionally include reformatting-resistant rules 640, which include: source without a corresponding reformatting operation; sink without a corresponding reformatting operation; source is a scalar value; sink may produce a scalar value; and internal operation depends on lanes being in a specified order. These types of operations were mentioned briefly above, and examples of these are given below.

Figure 26:
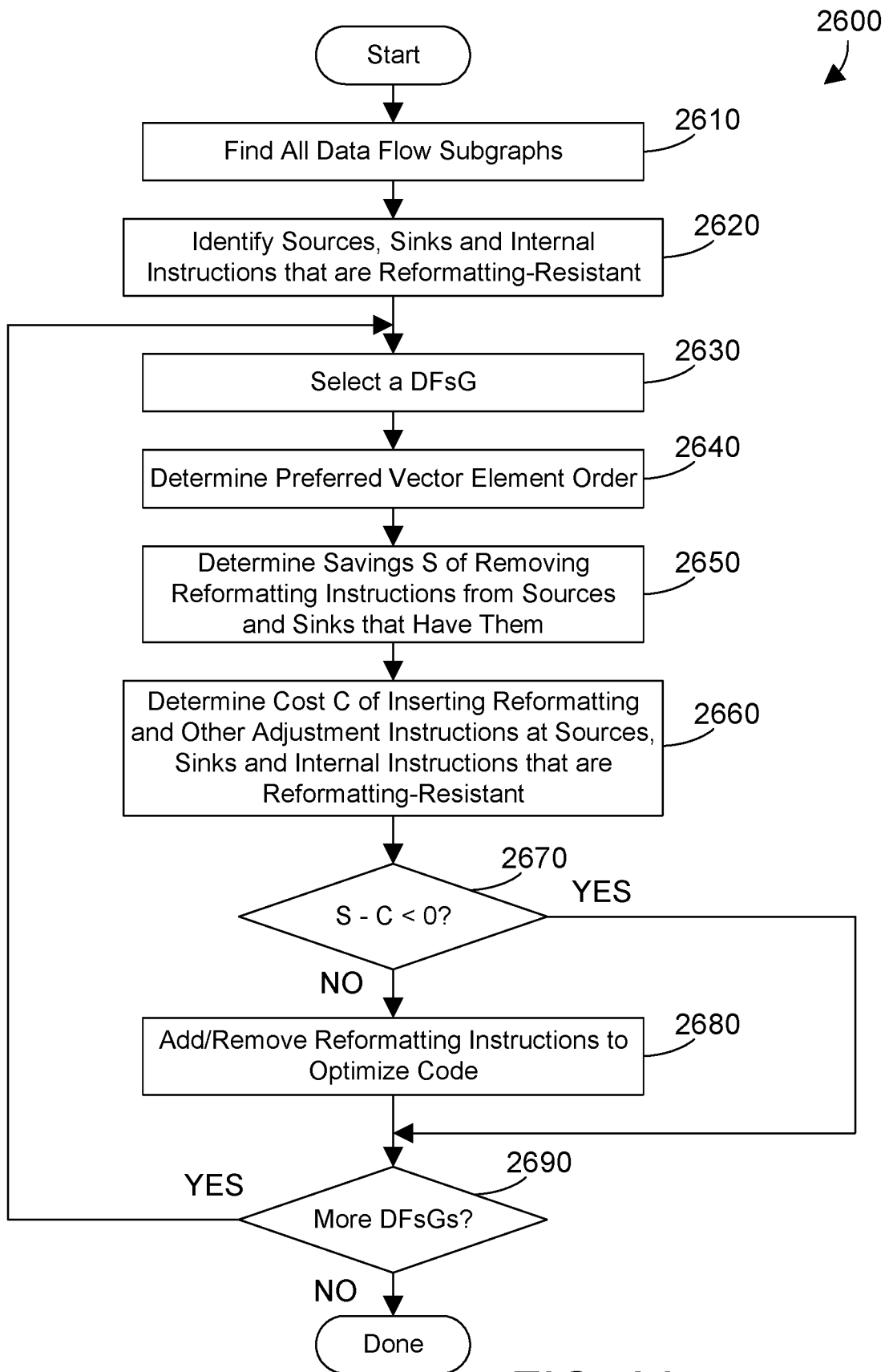
FIG. 26 is a flow diagram of a method for an optimizing compiler to optimize reformatting-resistant operations.

FIG. 26 shows a method 2600 for the vector optimization mechanism 126 shown in FIG. 1 to optimize code that includes reformatting-resistant instructions. First, all data flow subgraphs are found (step 2610). This is straightforward. Given def-use and use-def relationships for intermediate-representation instructions in a function being compiled, a compiler can use a classical union-find algorithm (such as that of Tarjan) to partition the vector instructions into maximal DFsGs. The cost of this is effectively linear in the size of the function. All sources, sinks and internal instructions that are reformatting-resistant are identified (step 2620). This is easily done during the same pass that constructs the data flow subgraphs. A data flow subgraph is selected (step 2630). A preferred vector element order for the selected data flow subgraph is determined (step 2640). In the typical case, most or all of the sources and sinks are accompanied by a reformatting instruction. The preferred vector element order is the one that allows removing of these reformatting instructions (but perhaps introducing other reformatting instructions for (a) sources or sinks without reformatting instructions, or (b) reformatting-resistant internal instructions. However, any preferred vector element order may be chosen within the scope of the disclosure and claims herein.

Next, determine the savings S of removing reformatting instructions from the sources and sinks that have them (step 2650). Savings may be expressed as number of instructions, estimated number of execution cycles, or any other appropriate measure. Determine the cost C of inserting reformatting and other adjustment instructions at sources and sinks, and at internal reformatting-resistant instructions (step 2660). This cost should be expressed in the same units as the savings. The cost is then subtracted from the savings (step 2670). When the savings minus the cost is negative (step 2670=YES), this means the cost of the proposed reformatting operation exceeds the cost of the code as-is, so no changes are made to the data flow subgraph. When the savings minus the cost is not negative (step 2670=NO), this means the cost of the proposed change is profitable, so the reformatting instructions are added and/or removed to optimize the code (step 2680). When there are more data flow subgraphs to process (step 2690=YES), method 2600 loops back to step 2630 and continues. When there are no more data flow subgraphs to process (step 2690=NO), method 2600 is done.

Figure 27:
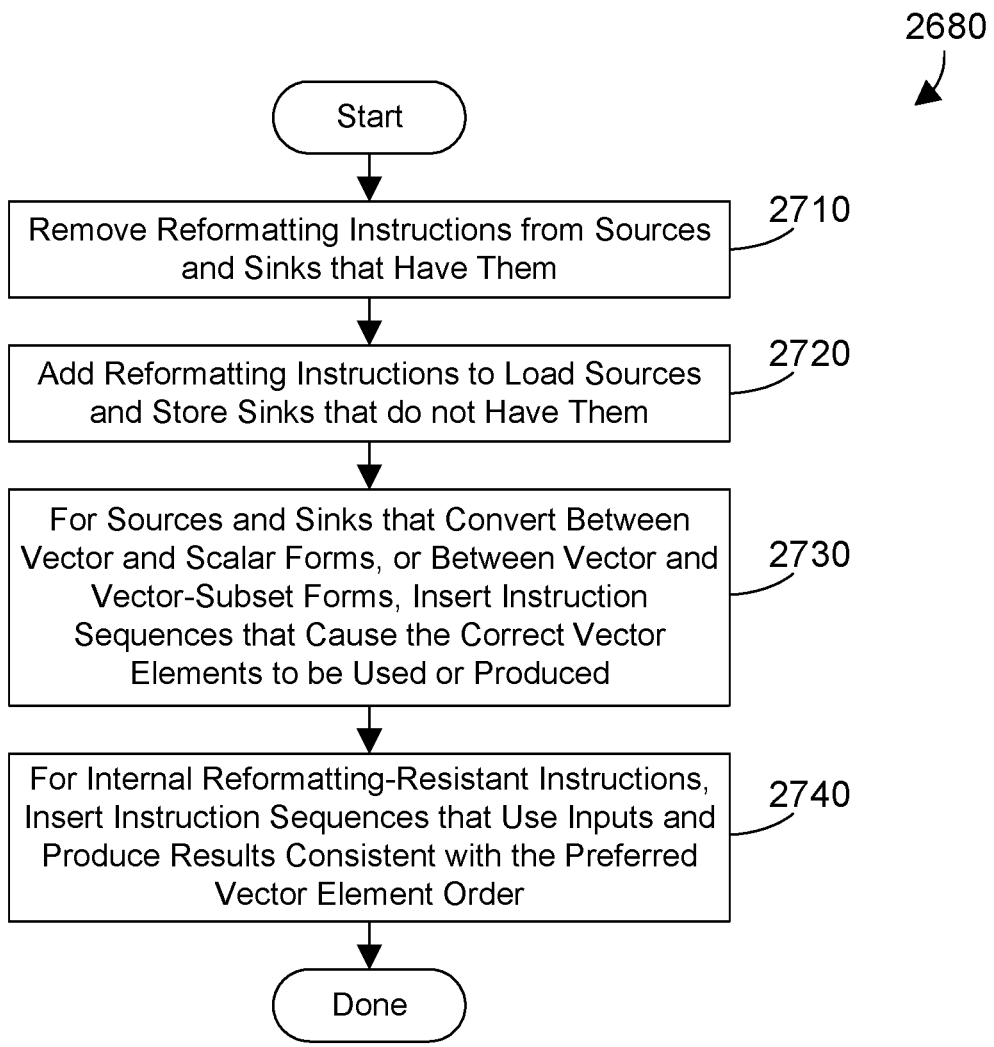
FIG. 27 is a flow diagram of a method showing specific steps that could be included in step 2680 in FIG. 26.

The addition or removal of reformatting instructions 2680 can be done in any suitable way. Method 2680 in FIG. 27 shows examples of some steps that could be performed in step 2680 in FIG. 26. Reformatting instructions may be removed from sources and sinks that have them (step 2710). Reformatting instructions may be added to load sources and store sinks that do not have them (step 2720). For sources and sinks that convert between vector and scalar forms, or between vector and vector-subset forms, instruction sequences may be inserted that cause the correct vector elements to be used or produced (step 2730). For internal reformatting-resistant instructions, instructions sequences may be inserted that use inputs and produce results consistent with the preferred vector element order (step 2740). The steps shown in FIG. 27 are shown by way of example of steps the vector optimization mechanism can take to optimize reformatting-resistant code. Any of these steps of combinations of these steps could be performed. Of course, other steps not shown in FIG. 27 could also be performed by the vector optimization mechanism within the scope of the disclosure and claims herein.

For the cases of conversions between vector and scalar forms, conversions between vector and vector-subset forms, and internal reformatting-resistant instructions, note that in the worst case correct code can be produced by introducing one or two formatting instructions. For a source instruction, a single formatting instruction following the source instruction suffices. For a sink instruction, a single formatting instruction preceding the sink instruction suffices. For an internal instruction, one formatting instruction before and one after the internal instruction will suffice. These are the worst cases; it is often possible for the vector optimization mechanism to generate alternate instruction sequences that require no additional instructions.

In an alternative embodiment, more than one preferred vector element order may be considered for a data flow subgraph. In this case, a cost value S-C is obtained for each preferred vector element order, and the one with lowest cost is selected for implementation. If none of the preferred element orders have a cost S-C>=0, then the data flow subgraph is not optimized.

Examples are now presented to illustrate how the vector optimization mechanism 126 can optimize code that includes reformatting-resistant operations. An example is given for each of the reformatting-resistant rules 640 shown in FIG. 25. For these examples, we use instructions from version 2.07B of the POWER Instruction Set Architecture (ISA). We will use a single reformatting instruction called "xxswapd." The xxswapd instruction takes an input 16-byte vector register, and produces the value of the input with the first doubleword (8 bytes) and the last doubleword (8 bytes) swapped. As an example, suppose vector register A contains four 4-byte word values [0, 1, 2, 3]. Then xxswapd B, A causes B to contain the values [2, 3, 0, 1]. Note that xxswapd is a reformatting operation that is its own inverse, since xxswapd B, A and xxswapd C, B causes C to have the same contents as A. Thus $p=p^{-1}=$xxswapd.

The POWER ISA defines several instructions for loading values into vector registers from memory. The "lvx" instruction will load bytes from memory into a register in left-to-right order (lowest addressed byte in memory goes into the most significant byte in the register, and so on) when the processor is in big-endian mode. It will load bytes from memory into a register in right-to-left order when the processor is in little-endian mode. By contrast, the "lxvd2x" instruction operates the same way regardless of the endian mode of the processor. It always places the first doubleword in memory into the most significant doubleword of the vector register, and places the second doubleword in memory into the least significant doubleword of the vector register. Thus for little-endian mode, the lxvd2x instruction appears to swap the doublewords with respect to their natural layout. To restore them to their normal locations, the lxvd2x instruction may be followed by an xxswapd instruction. If the data at location (base)+(offset) contains [0, 1, 2, 3], then lxvd2x A, base, offset
xxswapd A, A will cause vector register A to contain [0, 1, 2, 3] in little endian order. The lxvd2 x will load [2, 3, 0, 1], and the xxswapd will reformat this to [0, 1, 2, 3].

These two instructions also differ in terms of how they handle aligned vs. unaligned memory. A value to be loaded into a vector register is "aligned" if its address is divisible by 16; otherwise it is unaligned. The lxvd2x instruction is capable of loading unaligned values from memory, but the lvx instruction is not. Thus, although the lvx instruction may be preferable to use when a processor is in little-endian mode, it cannot be used when the compiler cannot prove that the memory value to be loaded is aligned.

Thus we may see code that mixes the use of lvx and lxvd2x/xxswapd. There are related store instructions that act similarly. The "stvx" instruction stores to memory according to the endian mode of the processor, and cannot handle unaligned addresses. The "stxvd2x" instruction can handle unaligned addresses, but swaps the doublewords when storing to memory on a processor in little-endian mode. Thus for unaligned stores, the compiler will usually generate:

xxswapd A, A
stxvd2x A, base, offset

We will also use some other instructions:

vadduwm: Vector Add Unsigned Word Modulo. This performs four independent additions of corresponding word values from two source vector registers, placing the sums into the destination vector register.

xxland: VSX Logical And. This performs a bitwise logical AND of two source vector registers, placing the result into the destination vector register.

xxspltw: VSX Splat Word. This copies a single word element out of a 4-word vector register into all four word elements of the destination vector register.

lvewx: Load Vector Element Word Indexed. This loads a single word from memory into a word element of a vector register, with the contents of the other word elements undefined.

stvewx: Store Vector Element Word Indexed. This stores a single word element from a vector register into memory.

For lvewx and stvewx, the source or destination word element depends on the address of memory. If the address is divisible by 16, the first element of the vector register is implied. If the address modulo 16=4, the second element is implied, and so forth.

In the examples, upper case letters refer to vector registers, and lower-case letters followed by a number refer to general-purpose registers. The latter are used here to form addresses with a base register added to an index (offset) register. mA means the memory loaded into A, or the memory stored to from A. "X" represents an undefined value.

FIG. 28 shows a code snippet that includes a source instruction without a reformatting operation. Suppose mA=[0, 1, 2, 3] and mB=[4, 5, 6, 7], with the six instructions shown in FIG. 28. The instructions in FIG. 28 form a data flow subgraph. Using the vector optimization rules 610, 620 and 630 in FIG. 25, the code in FIG. 28 is not eligible for optimization, because the "lvx" instruction is not followed by an xxswapd. However, using the reformatting-resistant rules 640, the vector optimization mechanism can optimize the code in FIG. 28. There are two xxswapd instructions that may be removed, namely, instructions 2 and 5, so S=2. To remove these, though, we must add an xxswapd after the lvx instruction, so C=1. Since S−C=1>=0, the reformatting optimization is cost-effective. The result is the code shown in FIG. 29, which results in saving one instruction. The instructions are carried out in different lanes, but the correct value is still stored into memory.

FIG. 30 shows a code snippet that includes a sink instruction without a reformatting operation. Suppose mA=[0, 1, 2, 3] and mB=[4, 5, 6, 7], with the six instructions shown in FIG. 30. There are two xxswapd instructions that may be removed, namely, instructions 2 and 4, so S=2. To remove these, though, we must add an xxswapd before the stvx instruction, so C=1. Since S−C=1>=0, the reformatting optimization is cost-effective. The result is the code shown in FIG. 31, which results in saving one instruction. The instructions are carried out in different lanes, but the correct value is still stored into memory.

FIG. 32 shows a code snippet that includes a source instruction that is a scalar value. Suppose mA=[0, 1, 2, 3], mB=[4, 5, 6, 7], and mC=[0, 0, 0, −1]. Further suppose that ((b2)+(i2)) modulo 16=12. There are three xxswapd instructions that may be removed, namely, instructions 2, 5 and 8, so S=3. To remove these, we must add an xxswapd following the lvewx instruction, so C=1. Since S−C=2>=0, the reformatting optimization is cost-effective. The result is the code shown in FIG. 33, which results in saving two instructions.

FIG. 34 shows a code snippet that includes a sink instruction that may produce a scalar value. Suppose mA=[0, 1, 2, 3], mB=[4, 5, 6, 7], and mR=[20, 40, 60, 80]. Further suppose that ((b3)+(i3)) modulo 16=12. There are two xxswapd instructions that may be removed, namely, instructions 2 and 4, so S=2. To remove these, we must add an xxswapd prior to the stvewx instruction, so C=1. Since S−C=1>=0, the reformatting optimization is cost-effective. The result is the code shown in FIG. 35, which results in saving one instruction.

FIG. 36 shows a code snippet that includes an internal reformatting-resistant instruction, namely instruction 5. Suppose mA=[0, 1, 2, 3] and mB=[4, 5, 6, 7]. There are three xxswapd instructions that may be removed, namely instructions 2, 4 and 7, so S=3. To remove these, we must modify the xxspltw to read lane 1 instead of lane 3 because the optimization effectively exchanges the doublewords in B. This replacement does not change the number of instructions, so C=0. Since S−C=3>=0, the reformatting optimization is cost-effective. The result is the code shown in FIG. 37, which results in saving three instructions.

The claims and disclosure herein provide a compiler that includes a vector optimization mechanism that optimizes vector operations that are reformatting-resistant, such as source instructions that do not have a corresponding reformatting operation, sink instructions that do not have a corresponding reformatting operation, a source instruction that is a scalar value, a sink instruction that may produce a scalar value, and an internal operation that depends on lanes being in a specified order. The ability to optimize vector instructions that are reformatting-resistant reduces the number of operations to improve the run-time performance of the code.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a computer program residing in the memory, the computer program including a plurality of instructions that includes at least one vector operation and that includes a plurality of reformatting-resistant vector operations that comprises a source instruction that operates on a scalar value; and
   a compiler residing in the memory and executed by the at least one processor, the compiler including a vector instruction optimization mechanism that optimizes at least one of the plurality of reformatting-resistant vector operations in the computer program to enhance run-time performance of the computer program.

2. The apparatus of claim 1 wherein the plurality of reformatting-resistant vector operations comprises a source instruction without a corresponding reformatting operation.

3. The apparatus of claim 1 wherein the plurality of reformatting-resistant vector operations comprises a sink instruction that can produce a scalar value.

4. The apparatus of claim 1 wherein the plurality of reformatting-resistant vector operations comprises an internal operation that depends on lanes being in a specified order.

5. The apparatus of claim 1 wherein the vector instruction optimization mechanism analyzes an existing code portion in the computer program, determines a proposed change to the existing code portion in the computer program, and when the proposed change to the existing code portion has a cost less than a cost of the existing code portion, the vector instruction optimization mechanism modifies the existing code portion with the proposed change.

6. The apparatus of claim 1 wherein the vector instruction optimization mechanism optimizes the at least one reformatting-resistant operation in the computer program by performing the steps of:

(a) finding all data flow subgraphs in the computer program;
(b) identifying source instructions, sink instructions, and internal instructions that are reformatting-resistant;
(c) selecting a data flow subgraph;
(d) determining a preferred vector element order;
(e) determining a savings of removing reformatting instructions from source instructions and sink instructions that have the reformatting instructions;
(f) determining a cost of inserting reformatting and other adjustment instructions at sources, sinks and internal instructions that are reformatting-resistant;
(g) when the savings minus the cost is not negative, removing the reformatting instructions from source instructions and sink instructions that have the reformatting instructions, and inserting the reformatting and other adjustment instructions; and
(h) when there are more data flow subgraphs to process, return to step (c) and continue processing until there are no more data flow subgraphs to process.

7. A computer-implemented method executed by at least one processor for processing a plurality of instructions in a computer program, the method comprising:
   providing a computer program including a plurality of instructions that includes at least one vector operation and that includes a plurality of reformatting-resistant vector operations, wherein the plurality of reformatting-resistant vector operations comprises a source instruction that operates on a scalar value; and
   optimizing at least one of the plurality of reformatting-resistant vector operations in the computer program to enhance run-time performance of the computer program.

8. The method of claim 7 wherein the plurality of reformatting-resistant vector operations comprises a source instruction without a corresponding reformatting operation.

9. The method of claim 7 wherein the plurality of reformatting-resistant vector operations comprises a sink instruction that can produce a scalar value.

10. The method of claim 7 wherein the plurality of reformatting-resistant vector operations comprises an internal operation that depends on lanes being in a specified order.

11. The method of claim 7 wherein the vector instruction optimization mechanism analyzes an existing code portion in the computer program, determines a proposed change to the existing code portion in the computer program, and when the proposed change to the existing code portion has a cost less than a cost of the existing code portion, the vector instruction optimization mechanism modifies the existing code portion with the proposed change.

12. The method of claim 7 wherein the step of optimizing the at least one reformatting-resistant operation in the computer program comprises:

(a) finding all data flow subgraphs in the computer program;
(b) identifying source instructions, sink instructions, and internal instructions that are reformatting-resistant;
(c) selecting a data flow subgraph;
(d) determining a preferred vector element order;
(e) determining a savings of removing reformatting instructions from source instructions and sink instructions that have the reformatting instructions;
(f) determining a cost of inserting reformatting and other adjustment instructions at sources, sinks and internal instructions that are reformatting-resistant;

(g) when the savings minus the cost is not negative, removing the reformatting instructions from source instructions and sink instructions that have the reformatting instructions, and inserting the reformatting and other adjustment instructions; and (h) when there are more data flow subgraphs to process, return to step (c) and continue processing until there are no more data flow subgraphs to process.

13. An article of manufacture comprising software stored on a computer readable storage medium, the software comprising:

a compiler that compiles a computer program including a plurality of instructions that includes at least one vector operation and that includes a plurality of reformatting-resistant vector operations that comprises a source instruction that operates on a scalar value, the compiler comprising a vector instruction optimization mechanism that optimizes at least one of the plurality of reformatting-resistant vector operations in the computer program to enhance run-time performance of the computer program.

14. The article of manufacture of claim 13 wherein the plurality of reformatting-resistant vector operations comprises a source instruction without a corresponding reformatting operation.

15. The article of manufacture of claim 13 wherein the plurality of reformatting-resistant vector operations comprises a sink instruction that can produce a scalar value.

16. The article of manufacture of claim 13 wherein the plurality of reformatting-resistant vector operations comprises an internal operation that depends on lanes being in a specified order.

17. The article of manufacture of claim 13 wherein the vector instruction optimization mechanism optimizes the at least one reformatting-resistant operation in the computer program by performing the steps of:

(a) finding all data flow subgraphs in the computer program;

(b) identifying source instructions, sink instructions, and internal instructions that are reformatting-resistant;

(c) selecting a data flow subgraph;

(d) determining a preferred vector element order;

(e) determining a savings of removing reformatting instructions from source instructions and sink instructions that have the reformatting instructions;

(f) determining a cost of inserting reformatting and other adjustment instructions at sources, sinks and internal instructions that are reformatting-resistant;

(g) when the savings minus the cost is not negative, removing the reformatting instructions from source instructions and sink instructions that have the reformatting instructions, and inserting the reformatting and other adjustment instructions; and (h) when there are more data flow subgraphs to process, return to step (c) and continue processing until there are no more data flow subgraphs to process.

\* \* \* \* \*